US009279964B2

(12) United States Patent
Hsiao et al.

(10) Patent No.: US 9,279,964 B2
(45) Date of Patent: Mar. 8, 2016

(54) WAFER LEVEL OPTICAL LENS STRUCTURE

(71) Applicant: HIMAX TECHNOLOGIES LIMITED, Tainan (TW)

(72) Inventors: Yun-Lien Hsiao, Tainan (TW); Shu-Hao Hsu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 102 days.

(21) Appl. No.: 14/159,818

(22) Filed: Jan. 21, 2014

(65) Prior Publication Data
US 2014/0204467 A1 Jul. 24, 2014

Related U.S. Application Data

(60) Provisional application No. 61/755,419, filed on Jan. 22, 2013.

(30) Foreign Application Priority Data

Aug. 16, 2013 (TW) .............. 102129558 A

(51) Int. Cl.
G02B 13/00 (2006.01)
B29D 11/00 (2006.01)

(52) U.S. Cl.
CPC ...... G02B 13/0085 (2013.01); B29D 11/00307 (2013.01); B29D 11/00317 (2013.01)

(58) Field of Classification Search
CPC ........... G02B 13/0085; G02B 13/0025; G02B 13/003; G02B 13/0055; B29D 11/00009; B29D 11/00307; B29D 11/00317; B29D 11/00326

USPC .............. 359/601, 619, 642; 257/432
See application file for complete search history.

(56) References Cited

U.S. PATENT DOCUMENTS

| 8,143,084 B2 | 3/2012 | Lee | |
|---|---|---|---|
| 2005/0074702 A1* | 4/2005 | Lee et al. | 430/321 |
| 2006/0228897 A1* | 10/2006 | Timans | H01L 21/67115 438/758 |
| 2010/0073531 A1* | 3/2010 | Yano et al. | 348/294 |
| 2011/0069395 A1* | 3/2011 | Lin et al. | 359/619 |
| 2011/0249176 A1* | 10/2011 | Hsueh | 348/374 |
| 2012/0002289 A1* | 1/2012 | Shin et al. | 359/601 |
| 2012/0200946 A1* | 8/2012 | Wippermann et al. | 359/811 |
| 2012/0307381 A1 | 12/2012 | Hsu | |
| 2013/0134540 A1* | 5/2013 | Maeda et al. | 257/432 |
| 2015/0077856 A1* | 3/2015 | Neo et al. | 359/619 |

FOREIGN PATENT DOCUMENTS

CN 100495077 6/2009
CN 102129110 7/2011
(Continued)

OTHER PUBLICATIONS

"Office Action of Taiwan Counterpart Application", issued on Sep. 19, 2014, p. 1-p. 5.
(Continued)

Primary Examiner — Jordan Schwartz
(74) Attorney, Agent, or Firm — J.C. Patents

(57) ABSTRACT

A wafer level optical lens structure is provided. A stress buffer layer is disposed between a light-transmissive substrate and a lens layer, so as to improve production yield of the wafer level optical lens.

10 Claims, 8 Drawing Sheets

(56) References Cited

FOREIGN PATENT DOCUMENTS

| CN | 102809794 | 12/2012 |
| JP | 2001-141909 | 5/2001 |
| JP | 2013-003542 | 1/2013 |
| JP | 2014-033052 | 2/2014 |
| TW | 476006 | 2/2002 |
| TW | 201231258 | 8/2012 |
| WO | 2012008387 | 1/2012 |

OTHER PUBLICATIONS

"Office Action of Japan Counterpart Application", issued on Dec. 16, 2014, p. 1-p. 4.

"Office Action of China Counterpart Application," issued on Oct. 10, 2015, p. 1-p. 5.

* cited by examiner

WAFER LEVEL OPTICAL LENS STRUCTURE

CROSS-REFERENCE TO RELATED APPLICATION

This application claims the priority benefits of U.S. provisional application Ser. No. 61/755,419, filed on Jan. 22, 2013 and Taiwan application serial no. 102129558, filed on Aug. 16, 2013. The entirety of each of the above-mentioned patent applications is hereby incorporated by reference herein and made a part of this specification.

BACKGROUND

1. Technical Field

The invention relates to an optical lens structure. Particularly, the invention relates to a wafer level optical lens structure.

2. Related Art

Along with a trend of module miniaturization and low price of electronic products, a wafer level module (WLM) technique draws attention. The WLM technique is mainly to use a wafer level fabrication technique to miniaturize a volume of the electronic product and decrease the cost thereof. For example, when the aforementioned technique is applied to fabricate wafer level optical (WLO) lens modules, the WLO lens modules may have smaller volume compares with that of a conventional lens module, so that the WLO lens modules can be applied to camera modules of, for example, mobile phones.

Along with increasing demand on optical quality of the WLO lens module, a structure of the WLO lens module gradually becomes complicated, and the WLO lens module has to include multiple layers of different material structures to satisfy the market demand. However, due to different physical characteristics of different materials, a stress effect between different layers of material is liable to cause defects in the WLO lens modules during a fabrication process, which decreases a product yield of the WLO lens modules.

SUMMARY

The invention is directed to a wafer level optical lens structure, which improves a production yield of a wafer level optical lens.

The invention provides a wafer level optical lens structure including a light-transmissive substrate, a lens layer and at least one stress buffer layer. The stress buffer layer is disposed between the light-transmissive substrate and the lens layer, and the stress buffer layer is suitable for patterning.

In an embodiment of the invention, the lens layer includes a lens, and the stress buffer layer has an opening corresponding to the lens.

In an embodiment of the invention, the wafer level optical lens structure further includes at least one optical layer, which is disposed between the lens layer and the stress buffer layer and/or between the stress buffer layer and the light-transmissive substrate.

In an embodiment of the invention, the optical layer has an opening corresponding to the lens.

In an embodiment of the invention, the stress buffer layer is a frame-shaped pattern, and a projection region of the frame-shaped pattern on the light-transmissive substrate does not cover a projection region of the lens on the light-transmissive substrate.

The invention provides a wafer level optical lens structure including a light-transmissive substrate, a lens layer and at least one stress buffer layer, where the lens layer includes a plurality of lenses. The stress buffer layer is disposed between the light-transmissive substrate and the lens layer, and the stress buffer layer is suitable for patterning.

In an embodiment of the invention, the stress buffer layer has a plurality of openings corresponding to the lenses.

In an embodiment of the invention, the wafer level optical lens structure further includes at least one optical layer, which is disposed between the lens layer and the stress buffer layer and/or between the stress buffer layer and the light-transmissive substrate.

In an embodiment of the invention, the optical layer includes at least one of a phase retardation film, a brightness enhancement film and a viewing angle improvement film.

In an embodiment of the invention, the optical layer has a plurality of openings corresponding to the lenses.

In an embodiment of the invention, the stress buffer layer has a plurality of frame-shaped patterns corresponding to the lenses, and a projection region of each of the frame-shaped patterns on the light-transmissive substrate does not cover a projection region of the corresponding lens on the light-transmissive substrate.

In an embodiment of the invention, the stress buffer layer completely covers the light-transmissive substrate.

According to the above descriptions, by configuring the stress buffer layer between the light-transmissive substrate and the lens layer, the defects caused by a stress effect appeared during the fabrication process of the wafer level optical lens are decreased, so as to improve the production yield of the wafer level optical lens.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
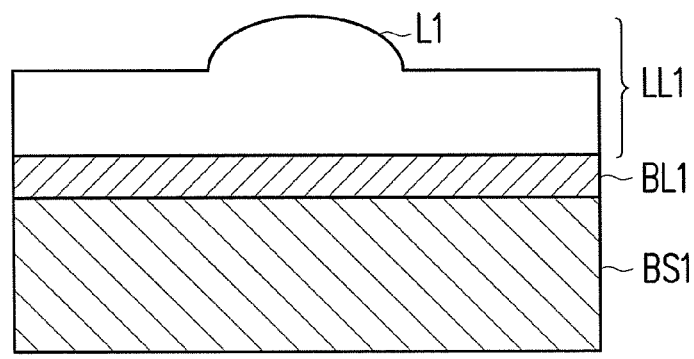
FIG. 1-FIG. 2 are schematic diagrams of a wafer level optical lens structure according to embodiments of the invention.

FIG. 1 is a schematic diagram of a wafer level optical lens structure according to an embodiment of the invention. Referring to FIG. 1, the wafer level optical lens structure includes a light-transmissive substrate BS1, a stress buffer layer BL1 and a lens layer LL1, where the lens layer LL1 includes a lens L1, and in the present embodiment, the lens L1 is a convex lens, though the invention is not limited thereto. The stress buffer layer BL1 is disposed between the light-transmissive substrate BS1 and the lens layer LL1, and is used for buffering a stress effect between the lens layer LL1 and the light-transmissive substrate BS1, so as to decrease defects caused by the stress effect appeared during the fabrication process of the wafer level optical lens, for example, the defects generated due to lattice mismatch between the lens layer LL1 and the light-transmissive substrate BS1, so as to improve the production yield of the wafer level optical lens.

Figure 2:
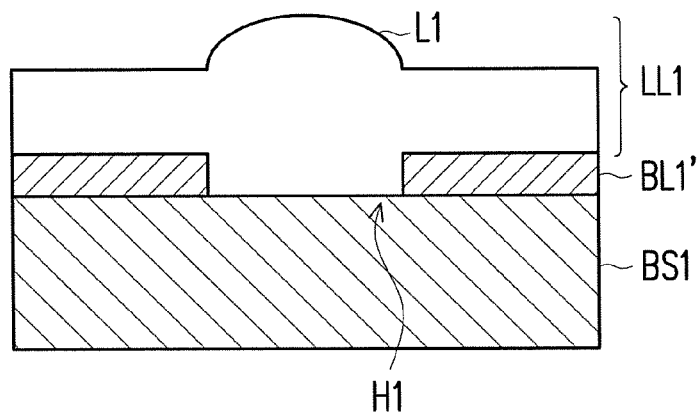
Figure 3:
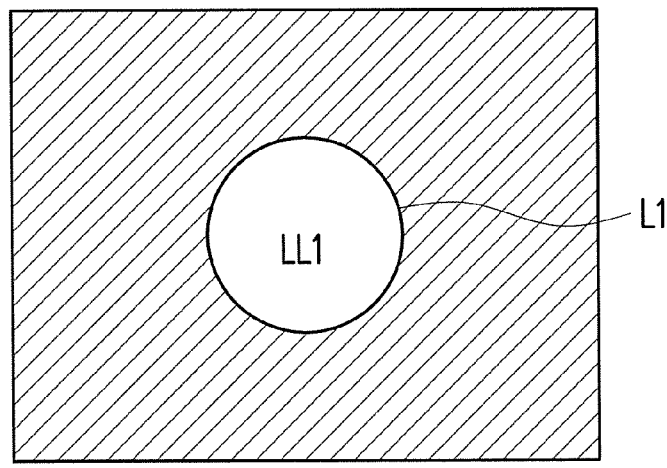
FIG. 3 is a top view of a wafer level optical lens according to an embodiment of the invention.

It should be noticed that in the present embodiment, the stress buffer layer BL1 completely covers the light-transmissive substrate BS1, so that the stress buffer layer BL1 has to be made of a transparent material. However, since the stress buffer layer BL1 is suitable for patterning, in some embodiments, the stress buffer layer BL1 is unnecessary to completely cover the substrate BS1. For example, the wafer level optical lens structure of FIG. 2 and FIG. 3, where FIG. 3 is a top view of the wafer level optical lens. Referring to FIG. 2 and FIG. 3, the stress buffer layer BL1 may have an opening H1 corresponding to the lens L1. Since the lens layer LL1 and the light-transmissive substrate BS1 are all transparent, the light can enter the structure through the lens layer LL1, and passes through the opening H1 of the stress buffer layer BL1' corresponding to the L1, and emits out of the structure through the light-transmissive substrate BS1. The stress buffer layer BL1' is not in a light propagating path, so that in the present embodiment, the stress buffer layer BL1' can be made of a non-transparent material.

Figure 4:
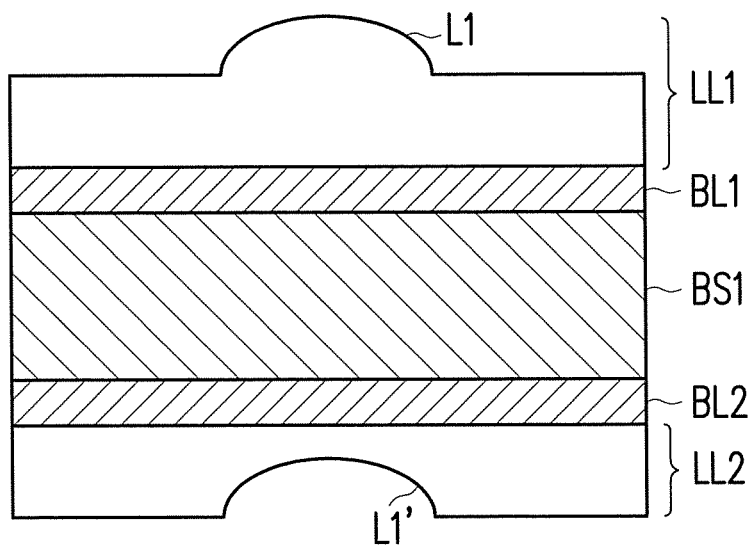
FIG. 4-FIG. 14 are schematic diagrams of wafer level optical lens structures according to embodiments of the invention.

FIG. 4 is a schematic diagram of a wafer level optical lens structure according to another embodiment of the invention. Referring to FIG. 4, in the present embodiment, compared to the wafer level optical lens structure of the embodiment of FIG. 1, the wafer level optical lens structure of the present embodiment further includes a stress buffer layer BL2 and a lens layer LL2, where the lens layer LL2 includes a lens L1', and in the present embodiment, the lens L1' is a concave lens, though the invention is not limited thereto. The stress buffer layer BL2 and the lens layer LL2 are located at different side of the light-transmissive substrate BS1 compared with that of the stress buffer layer BL1 and the lens layer LL1, i.e. located at another side of the light-transmissive substrate BS1, and the stress buffer layer BL2 is disposed between the light-transmissive substrate BS1 and the lens layer LL2.

Figure 5:
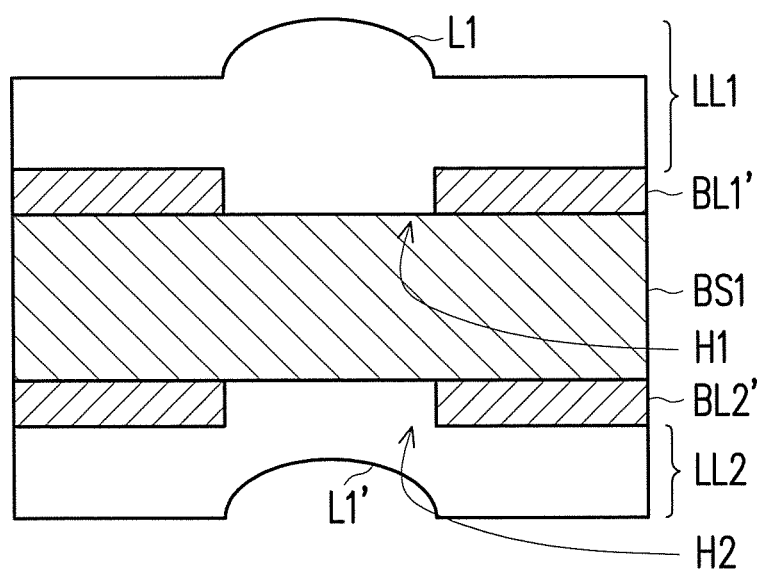

Similarly, since the stress buffer layer BL2 completely covers the light-transmissive substrate BS1, the stress buffer layer BL2 has to be made of a transparent material. However, similar to the stress buffer layer BL1, since the stress buffer layer BL2 is also suitable for patterning, the stress buffer layer BL2 can also be designed to have an opening H2 corresponding to the lens L1. FIG. 5 is a schematic diagram of a wafer level optical lens structure according to another embodiment of the invention, referring to FIG. 5, the light enters the structure through the lens layer LL1, and passes through the stress buffer layer BL1', the light-transmissive substrate BS1 and the stress buffer layer BL2', and emits out of the structure through the lens layer LL2.

Figure 6:
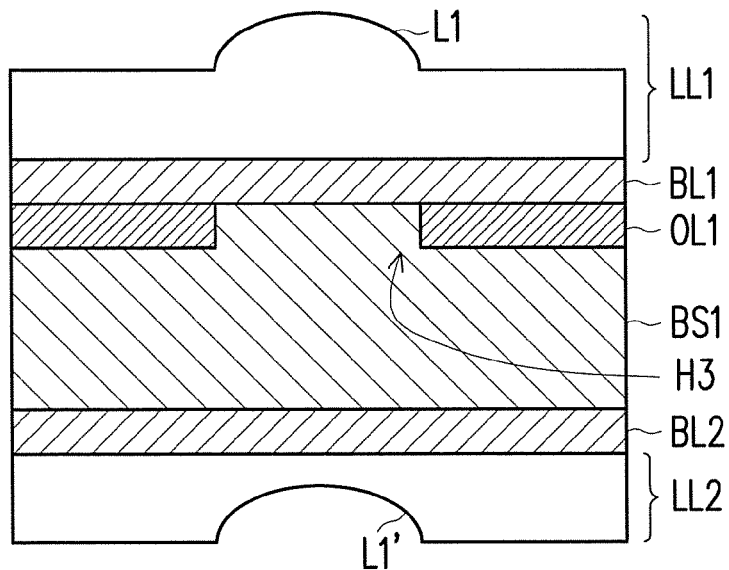
Figure 7:
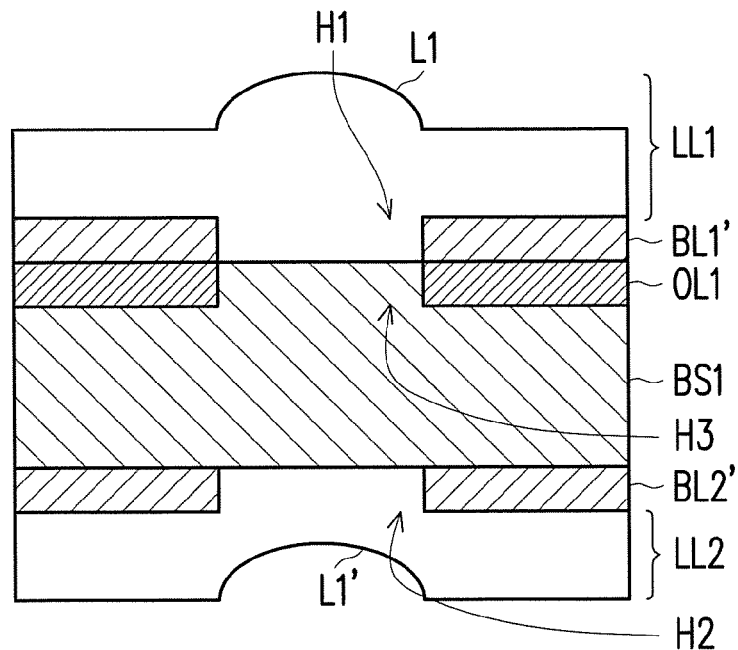

Moreover, although the stress buffer layers of the above embodiment are all located between the lens layers and the light-transmissive substrate, in other embodiments, besides the lens layers and the light-transmissive substrate, the wafer level optical lens structure may further include different optical layers to improve the optical quality of the wafer level optical lens structure, so as to satisfy requirements of actual applications. The optical layer can be at least one of a phase retardation film, a brightness enhancement film and a viewing angle improvement film. Therefore, the stress buffer layer can also be disposed between the lens layer and any optical layer between the lens layer and the light-transmissive substrate. FIG. 6 and FIG. 7 are schematic diagrams of wafer level optical lens structures according to embodiments of the invention. As shown in FIG. 6 and FIG. 7, the wafer level optical lens structures of the two embodiments all includes an optical layer OL1, where the optical layer OL1 is formed on the light-transmissive substrate BS1, and the stress buffer layer BL1 (or the stress buffer layer BL1') is disposed between the optical layer OL1 and the lens layer LL1.

It should be noticed that the embodiments of FIG. 6 and FIG. 7 are only examples, and invention is not limited thereto. In other embodiments, the wafer level optical lens structure may include more layers of the optical layer, and the stress buffer layer BL1 (or the stress buffer layer BL1') can be disposed between any two optical layers according to an actual requirement. Moreover, the optical layer OL1 of the embodiments of FIG. 4 and FIG. 5 has an opening H3 corresponding to the lens L1, though in other embodiments, the optical layer OL1 can also completely cover the light-transmissive substrate BS1.

Figure 8:
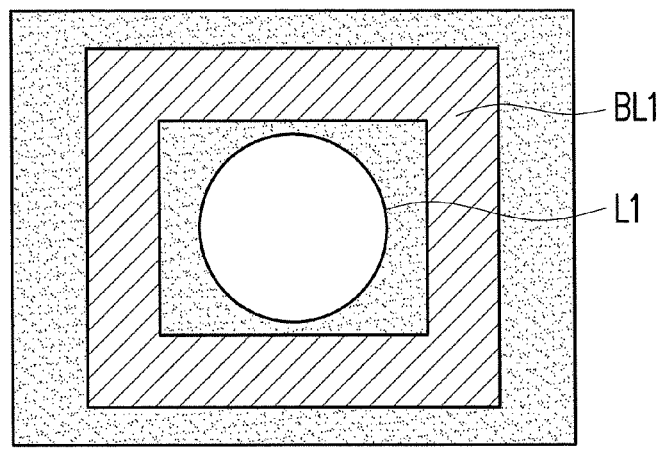
Figure 9:
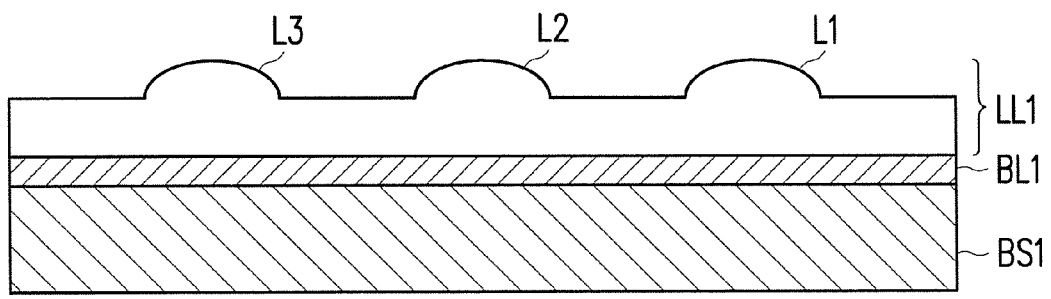
Figure 10:
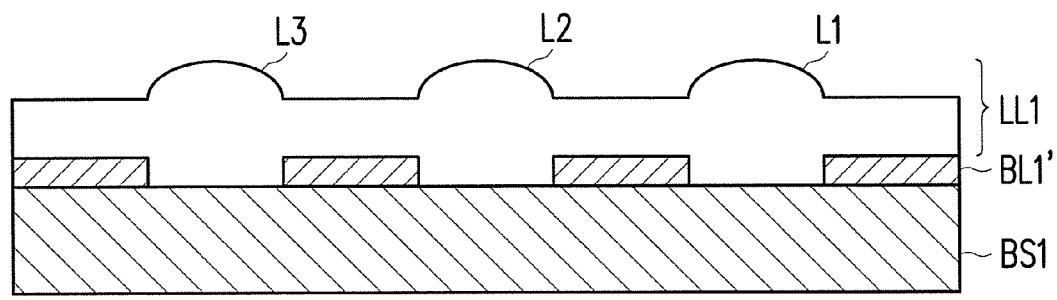
Figure 11:
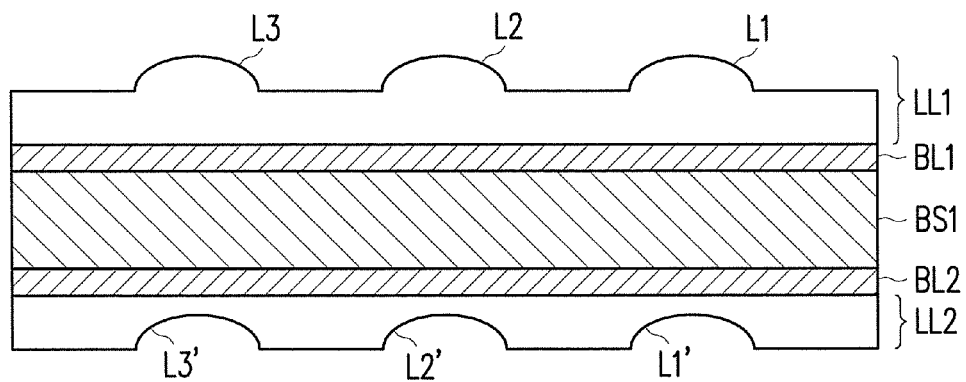
Figure 12:
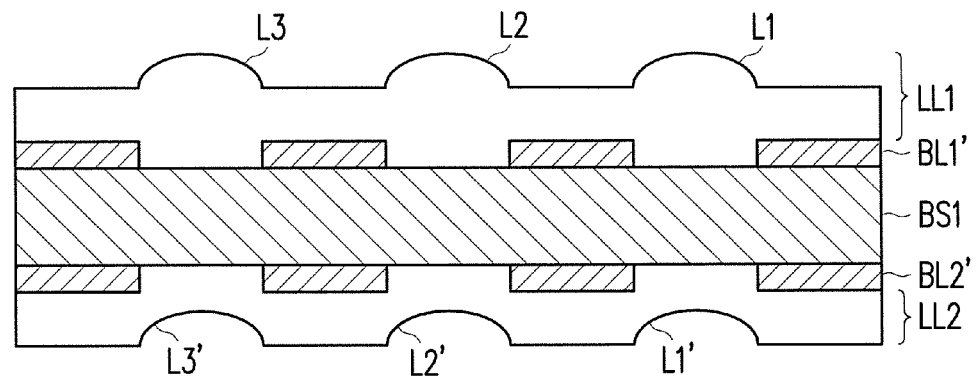
Figure 13:
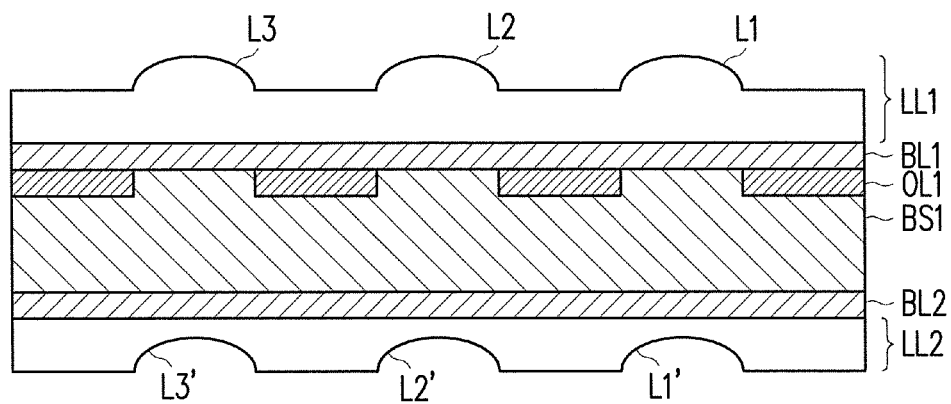
Figure 14:
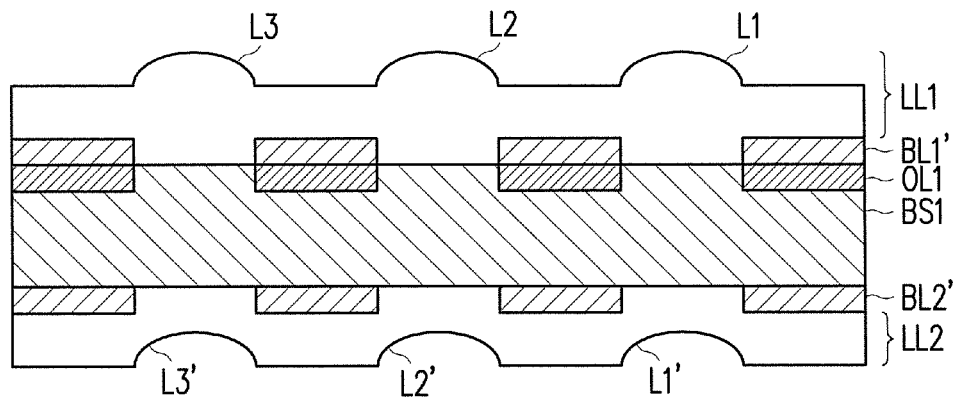

Moreover, in some embodiments, the patterns of the stress buffer layer are not limited to the aforementioned implementations of completely covering the light-transmissive substrate BS1 or having the opening corresponding to the lens L1. The stress buffer layer may have different patterns or thickness, in this way, the pattern or thickness of the stress buffer layer can be adjusted according to stress variation of each part of the wafer level optical lens structure, for example, the stress buffer layer can be only fabricated on the part of the wafer level optical lens structure with larger stress. FIG. 8 is a top view of a wafer level optical lens structure according to another embodiment of the invention. Referring to FIG. 8, in the present embodiment, the stress buffer layer BL1 is fabricated into a frame-shaped pattern, which only covers a part region outside the lens L1 without covering the lens L1, i.e. a projection region of the stress buffer layer BL1 on the light-transmissive substrate BS1 does not cover a projection region of the lens L1 on the light-transmissive substrate BS1.

Moreover, in the aforementioned embodiments, only the wafer level optical lens structures with a single lens are provided for descriptions, though in an actual application, the wafer level optical lens may also have an array structure, i.e. the aforementioned wafer level optical lens structures can be applied to a wafer level optical lens having a plurality of lenses. FIG. 9-FIG. 14 are schematic diagrams of wafer level optical level structures according to embodiments of the invention, where the embodiments of FIG. 9-FIG. 14 respectively correspond to the embodiments of FIG. 1, FIG. 2, FIG. 4-FIG. 7, and a difference between the corresponding embodiments is that the embodiments of FIG. 9-FIG. 14 have a plurality of lenses (lenses L1-L3, L1'-L3'), where the stress buffer layers or optical layers of FIG. 10, FIG. 12-FIG. 14 further have openings corresponding to the lenses L1-L3. Since configuration and variation of the stress buffer layer have been described in detail in the aforementioned embodiments, those with ordinary skill in the art can learn structure configurations of the embodiments of FIG. 9-FIG. 14 according to instructions of the aforementioned embodiments, and details thereof are not repeated.

Figure 15:
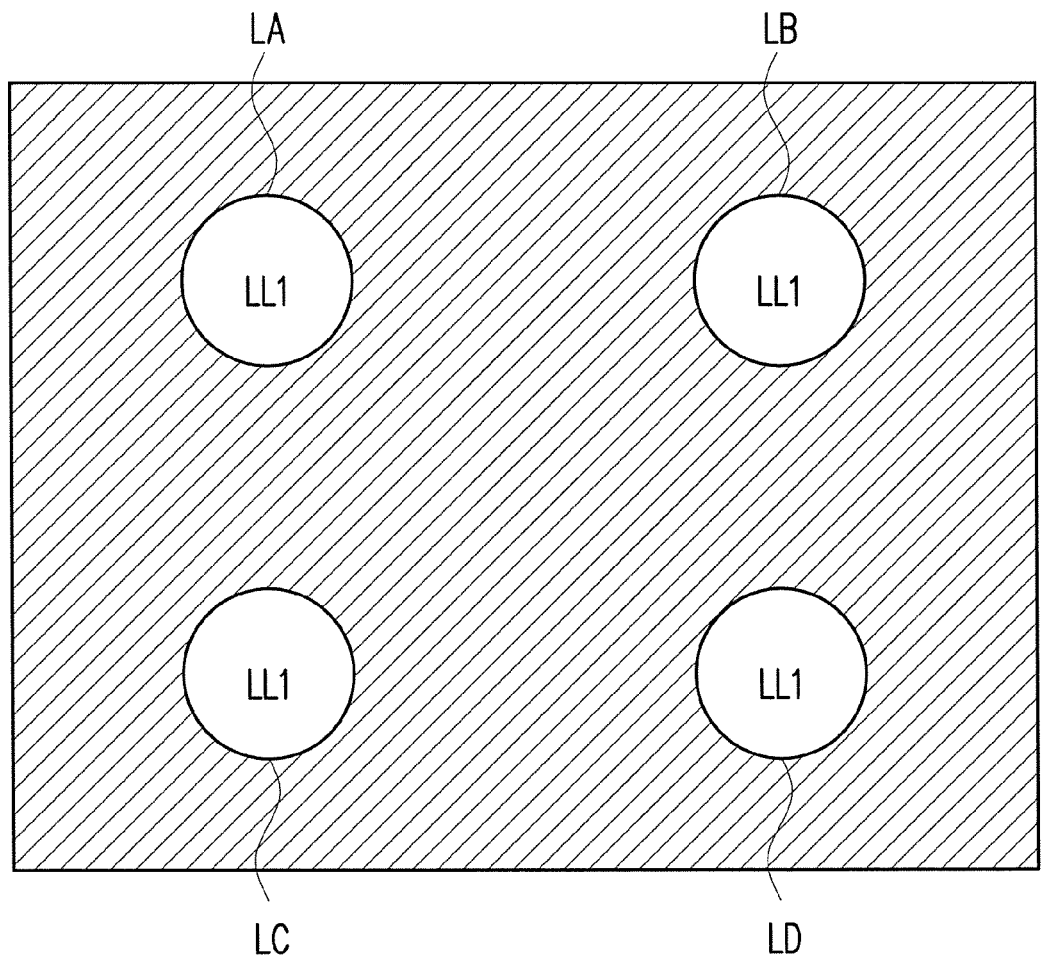
FIG. 15-FIG. 16 are top views of wafer level optical lens structures according to embodiments of the invention.
Figure 16:
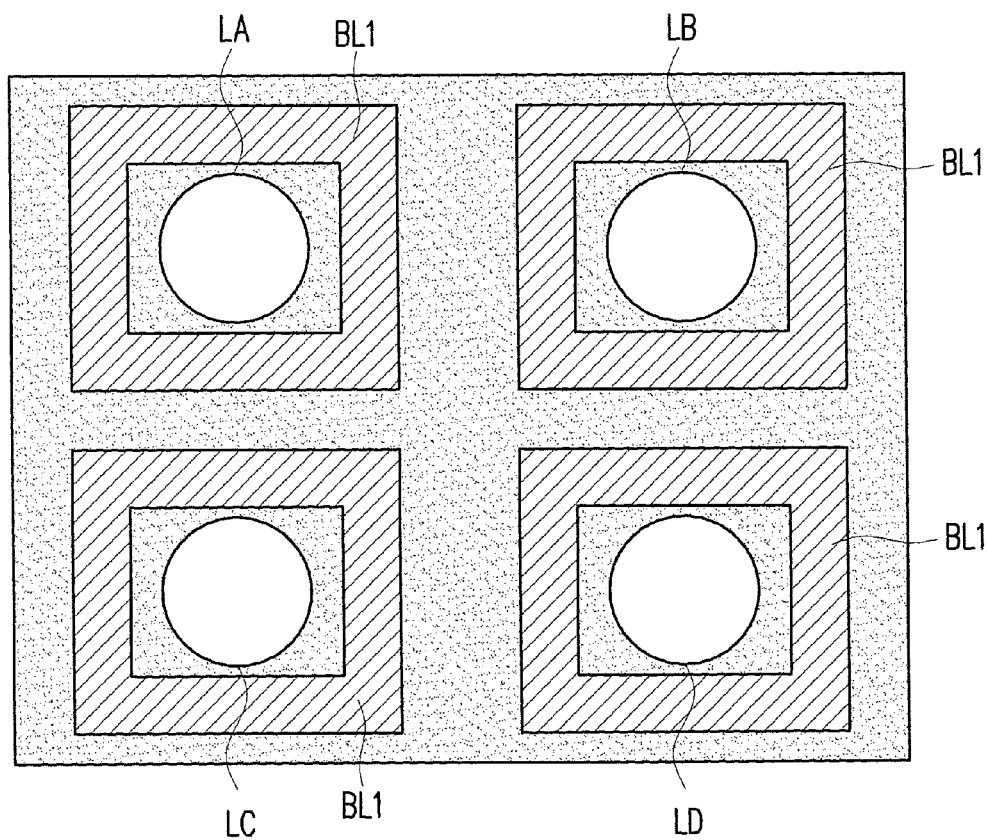

Similarly, FIG. 15 and FIG. 16 are top views of wafer level optical lens structures according to embodiments of the invention, where the embodiments of FIG. 15 and FIG. 16 respectively correspond to the embodiments of FIG. 3 and FIG. 8. A difference between the embodiments of FIG. 15 and FIG. 16 and the embodiments of FIG. 3 and FIG. 8 is that the wafer level optical lens structures of FIG. 15 and FIG. 16 are respectively arranged in an array, and respectively includes a plurality of lenses LA-LD. It should be noticed that in FIG. 16, the stress buffer layers BL1 corresponding to the lenses all have the same frame-shaped pattern, though the invention is not limited thereto, i.e. the stress buffer layer BL1 corresponding to each lens can be correspondingly adjusted according to a stress on the corresponding position thereof, for example, to change the pattern or thickness, etc. of the stress buffer layer BL1, and in other embodiments, shapes of the stress buffer layers BL1 corresponding to the lenses can be mutually different.

In summary, by configuring the stress buffer layer between the light-transmissive substrate and the lens layer, the defects caused by a stress effect appeared during the fabrication process of the wafer level optical lens are decreased, so as to improve the production yield of the wafer level optical lens.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A wafer level optical lens structure, comprising:
   a light-transmissive substrate;
   a lens layer; and
   at least one stress buffer layer, disposed between the light-transmissive substrate and the lens layer, wherein the stress buffer layer has a specific pattern for buffering a stress effect between the lens layer and the light-transmissive substrate, and the specific pattern of the stress buffer layer is determined according to stress variations between different parts of the wafer level optical lens structure, wherein the lens layer comprises a lens, and the stress buffer layer has an opening corresponding to the lens.

2. The wafer level optical lens structure as claimed in claim 1, further comprising:
   at least one optical layer, disposed between the lens layer and the stress buffer layer and/or between the stress buffer layer and the light-transmissive substrate.

3. The wafer level optical lens structure as claimed in claim 2, wherein the optical layer comprises at least one of a phase retardation film, a brightness enhancement film and a viewing angle improvement film.

4. The wafer level optical lens structure as claimed in claim 2, wherein the optical layer has an opening corresponding to the lens.

5. The wafer level optical lens structure as claimed in claim 1, wherein the stress buffer layer is a frame-shaped pattern, and a projection region of the frame-shaped pattern on the light-transmissive substrate does not cover a projection region of the lens on the light-transmissive substrate.

6. A wafer level optical lens structure, comprising:
   a light-transmissive substrate;
   a lens layer, comprising a plurality of lenses; and
   at least one stress buffer layer, disposed between the light-transmissive substrate and the lens layer, wherein the stress buffer layer has a specific pattern for buffering a stress effect between the lens layer and the light-transmissive substrate, and the specific pattern of the stress buffer layer is determined according to stress variations between different parts of the wafer level optical lens structure, wherein the stress buffer layer has a plurality of openings corresponding to the lenses.

7. The wafer level optical lens structure as claimed in claim 6, further comprising:
   at least one optical layer, disposed between the lens layer and the stress buffer layer and/or between the stress buffer layer and the light-transmissive substrate.

8. The wafer level optical lens structure as claimed in claim 7, wherein the optical layer comprises at least one of a phase retardation film, a brightness enhancement film and a viewing angle improvement film.

9. The wafer level optical lens structure as claimed in claim 7, wherein the optical layer has a plurality of openings corresponding to the lenses.

10. The wafer level optical lens structure as claimed in claim 6, wherein the stress buffer layer has a plurality of frame-shaped patterns corresponding to the lenses, and a projection region of each of the frame-shaped patterns on the light-transmissive substrate does not cover a projection region of the corresponding lens on the light-transmissive substrate.

* * * * *